March 8, 1949.

E. M. WHALEN 2,463,731

FASTENER

Filed Aug. 6, 1945

INVENTOR
EDWARD M. WHALEN
BY
ATTORNEY

Patented Mar. 8, 1949

2,463,731

UNITED STATES PATENT OFFICE 2,463,731

FASTENER

Edward M. Whalen, Cleveland, Ohio, assignor to The Cleveland Pneumatic Tool Company, Cleveland, Ohio, a corporation of Ohio Application August 6, 1945, Serial No. 609,160

4 Claims. (Cl. 85—5)

The present invention relates to a fastener for temporarily holding together perforated plates in perforate alignment, preparatory to the riveting thereof.

An important object of the invention is to produce a fastener or temporary rivet which may be readily applied to and removed from the work, the temporary rivet being constructed in a manner forming a simple assembly which is strong, durable and efficient.

Another object of the invention is to provide a fastener capable of securing perforated metal sheets together in perfect perforate alignment wherein the parts thereof are united in a manner to preclude separate disengagement thereof should the fastener break while in use or while being applied to the sheets.

A further object of the invention is to provide a fastener for temporarily holding together two perforated sheets including a cup-shaped housing having a base adapted to rest on the upper sheet, a retainer pin slidable through a bore formed in the base of the housing, said retainer pin having a pair of legs maintained in spaced relation by means of a spreader, a compression spring for urging said retainer pin and legs upwardly relative to said housing, spreader and spring for locking said retainer pin, spreader and spring so as to limit the expansion of the spring and to prevent separate disengagement of the parts should the fastener break while in use or while being applied to the sheets.

Other objects and advantages more or less ancillary to the foregoing reside in the specific construction and aggroupment of the elements peculiar to this structure, as will become apparent from a more complete examination of this specification.

Figure 6:
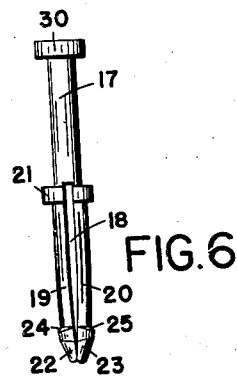
Figure 6 is an elevational view of the retainer pin.

Referring to the drawing for a more detailed description thereof, particularly Figures 1 to 4, the new and improved fastener is generally designated by the reference numeral 12 and comprises a cup-shaped housing 13 formed at its upper end with an external annular flange 14. The lower end 15 of the housing 13 is formed with a central bore 16 through which is slidably mounted a retainer pin 17. This retainer pin is adapted to project above and below the housing 13 and, as illustrated in Figure 6, is preferably formed of a single piece of cylindrical material. This retainer is split throughout a portion of its length, as indicated at 18, to provide a pair of legs 19 and 20 which project through the central bore 16 and are formed to normally tend to flex toward each other.

The slot 18 terminates substantially midway between the ends of the retainer 17 and extends through an annular shoulder 21 formed on the retainer 17 and slotted for a purpose to be hereinafter more fully described.

Each leg 19 and 20 has its free end provided with a tapered portion or foot 22 and 23 having outwardly inclined lateral projections 24 and 25 for normally engaging the lower face of the base 16 when the fastener is in inoperative position. As will hereinafter appear, however, the outwardly inclined lateral projections 24 and 25 are also adapted to engage the lowermost face of the sheets being clamped so as to retain such sheets between the base 16 and the tapered ends or feet 22 and 23.

Figure 1:
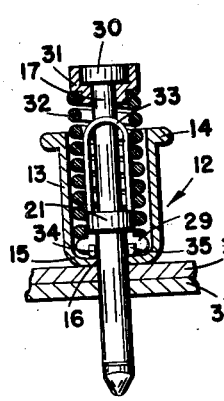
Figure 1 is a vertical sectional view, with parts in elevation, of the improved fastener illustrating one position assumed during its insertion in the work.
Figure 2:
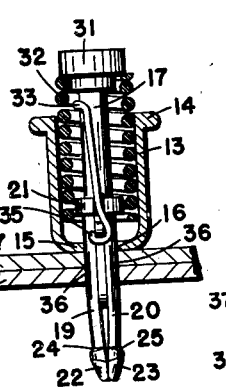
Figure 2 is a vertical sectional view, with parts in elevation, the fastener being rotated 90° from the position shown in Figure 1.
Figure 3:
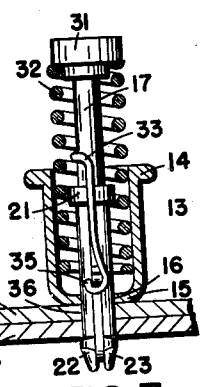
Figure 3 is a vertical sectional view with the fastener in sheet clamping position.
Figure 4:
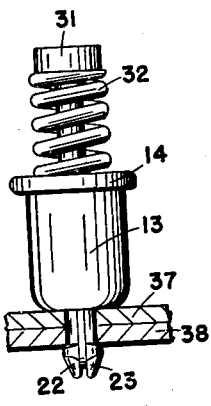
Figure 4 is a side elevational view of the fastener in sheet clamping position.
Figure 5:
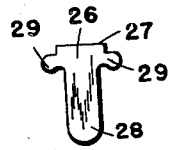
Figure 5 is an elevational view of the spreader which maintains separation of the legs on the retainer pin.

Slidably mounted between the legs 19 and 20 there is a spreader 26 carried inside the housing at the bottom thereof and which comprises a head portion 27, tail portion 28, and laterally disposed portions or cross arms 29. The cross arms 29 extend laterally of the retainer pin 17 within the slot 18 and are normally held adjacent to the inner surface of the base 16. The head and tail portions are disposed between the legs for maintaining said legs out of contact with one another, and for preventing inward lateral movement of the feet 22 and 23 when the fastener is in sheet clamping engagement, as illustrated in Figures 3 and 4.

Figure 7:
Figure 7 is an aggregate plan and side elevation view of the collar or cap which is detachably connected to the upper end of the retainer pin.
Figure 8:
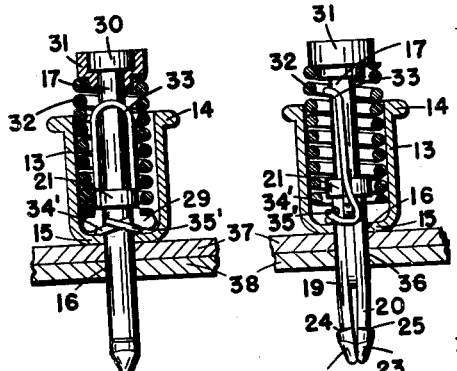
Figures 8, 9, 10 and 11 are views respectively similar to Figures 1, 2, 3 and 4 but illustrating a modified form of the invention.
Figure 9:
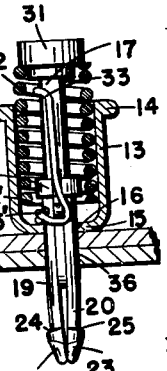
Figure 10:
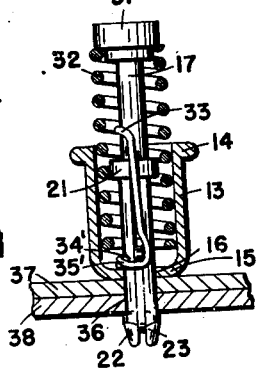
Figure 11:
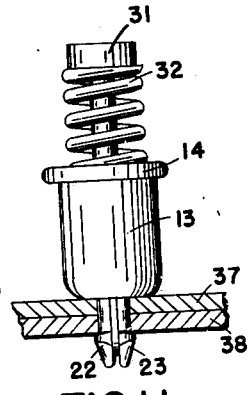

The upper end of the retainer pin 17 is formed with an annular flange 30 which carries the removable C-shaped collar 31. This collar is shown in Figure 7 and it provides a supporting area for one end of the compression spring 32, the other end of the compression spring resting upon the cross arms 29 of the spreader 26 which serve as a spring seat. The compression spring 32 normally urges the retainer pin 17 upwardly relative to the housing 13 and exerts sufficient force to retain the sheets between the base of the housing and the bifurcated ends of the retainer pin when said fastener is applied to the sheets.

In accordance with the present invention a means has been provided for uniting or locking the retainer pin 17 and spreader 26 within the housing 13 so that these elements will not become separated or disengaged with the possibility of being forcibly ejected from the housing by the compression spring upon breakage of the retainer pin and/or spreader. This means comprises a U-shaped wire 33, the free ends of which extend downwardly and under the arms 29 of the spreader 26. It will be noted that the U-shaped wire locking member has its downwardly extending arms confined within the slotted portion of the annular shoulder 21 and extending along the upper reduced portion of the stem from their juncture with the U bend which makes a half turn about the stem. The locking wire therefore closely engages the reduced upper end of the retainer pin 17 and has limited movement relative to said pin through the slotted shoulder 21, said relative movement being limited in one direction by the coaction between the shoulder 21 and the U bend. This arrangement, together with the engagement of the curved free ends 34 and 35 beneath the spreader cross arms 29, serves to lock the retainer 17, spreader 26, and spring 32 for preventing separate disengagement thereof.

In the operation of the device the temporary fastener is applied to or removed from the work by the use of a plier-like tool, the construction of which is well known in this art, one jaw of the tool engaging the under side of the annular flange 14 and another jaw engaging the end 30 of the retainer pin 17. Upon movement of the two jaws toward each other, the retainer pin 17 will be forced downward relative to the housing 13 by compressing the spring 32 and will cause longitudinal movement of the feet 22 and 23 away from the base 15 and out of operative engagement with the tail portion 28 of the spreader 26. The feet 22 and 23 are then free to be inserted through the aligned perforations 36 of the pair of sheets 37 and 38. It is to be understood that the legs 19 and 20 are formed of a material having a certain degree of resiliency which tends to cause the feet 22 and 23 to spring toward each other when out of engagement with the spreader 26. With the fastener in the position shown in Figure 2, the pressure exerted on the annular flange 14 and head 30 is released and the retainer 17, due to the action of the compression spring 32, will again be urged upward relative to the housing 13, causing the feet 22 and 23 to be separated or moved laterally away from each other by the spreader tail portion 28. This will cause the lateral projections 24 and 25 to engage the under side of the work sheet 38 for clamping the pair of sheets between the feet 22 and 23 and the base 15. This position of the fastener is shown in Figures 3 and 4 of the drawing.

In order to remove the fastener from the work, pressure is again exerted on the fastener by means of the plier-like tool to compress the spring so that the feet 22 and 23 will again spring toward each other to permit their withdrawal from the perforations 36.

The fastener in accordance with the present invention has been primarily designed because of its safety features. It has been determined from past experiences that workmen have been seriously injured by parts of the fastener being thrown out of the housing. This is usually caused by breakage of the tapered ends 22 and 23 when the spring 32 is under compression. The suddenly released energy which has been stored in the spring tends to throw the retainer pin out of the housing with considerable force. This hazard is substantially eliminated by reason of the retainer pin, spring, and spreader being locked together through the medium of the locking wire 33. The arrangement of the spreader being maintained in position by the spring 32 resting on the cross arms thereof and being locked to the retainer pin 17 by the means just described, will prevent the free expansion of the spring should breakage of the parts occur and will obviate the possibility of any of the parts being separated or thrown out of the housing.

The form of the invention shown in Figures 8 to 11 differs from the preferred form solely in the manner in which the ends of the locking wire are secured to the cross arms of the spreader. In this modified form it will be noted that the free ends 34' and 35' pass under the spreader and cross each other as they wrap around the leg 19 of the retainer stem 17. In some instances it may be desirable to provide this additional means of securing the free ends of the locking wire 33 to the cross arms of the spreader. The operation and advantages of this form of the invention are the same as those hereinabove described.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A device for temporarily clamping together perforated sheets in superposed relation comprising a housing having a sheet engaging base provided with an opening, a retainer including a pair of laterally resilient legs slidable through said opening, feet on one end of said legs adapted to engage the underside of the sheets being clamped, spring means for drawing said legs inwardly of said housing to urge said feet into sheet clamping engagement, a spreader for said legs, an annular shoulder on said retainer having a longitudinal aperture, and means slidable in said aperture and linking together said shoulder and said spreader for preventing the accidental release of said retainer from said housing.

2. A device for temporarily clamping together perforated sheets in superposed relation comprising a housing having a sheet engaging base provided with an opening, a retainer including a pair of laterally resilient legs slidable through said opening, feet on one end of said legs adapted to engage the underside of the sheets being clamped and to engage said base when said device is inoperative, spring means for drawing said legs inwardly of said housing to urge said feet into sheet clamping engagement, a spreader for said legs having laterally disposed portions in contact with said spring means, an annular shoulder on said retainer having a longitudinal aperture, and means slidable in said aperture and cooperating with said shoulder and said spreader to limit the operation of said spring means beyond a predetermined range.

3. A device for temporarily clamping together perforated sheets in superposed relation comprising a housing having a sheet engaging base provided with an opening, a retainer including a pair of laterally resilient legs slidable through said opening, feet on one end of said legs adapted to engage the underside of the sheets being clamped and to engage said base when said device is inoperative, a shoulder formed on each leg near the other end thereof, spring means for drawing said legs inwardly of said housing to urge said feet into sheet clamping engagement, a spreader for said legs, and means slidable relative to said retainer between said shoulders and having engagement with said spreader for joining said retainer and said spreader to limit the operation of said spring means beyond a predetermined range.

4. A device for temporarily clamping together perforated sheets in superposed relation comprising a housing having a sheet engaging base provided with an opening, a retainer including a pair of laterally resilient legs slidable through said opening, feet on one end of said legs adapted to engage the underside of the sheets being clamped, a shoulder formed on each leg near the other end thereof, spring means for drawing said legs inwardly of said housing to urge said feet into sheet clamping engagement, a spreader for said legs having laterally disposed portions in contact with said spring means, and a U-shaped link slidable relative to said retainer and cooperating with one of said shoulders and said spreader to prevent the accidental release of said retainer from said housing.

EDWARD M. WHALEN.

REFERENCES CITED

The following references are of record in the file of this patent:

UNITED STATES PATENTS

| Number | Name | Date |
|---|---|---|
| 2,371,879 | Wallace | Feb. 3, 1942 |
| 2,350,630 | Melcher | June 6, 1944 |